United States Patent Office 2,993,062

Patented July 18, 1961

2,993,062

CARBOXAMIDES OF N-PENTACHLOROPHENYL-ETHYLENEDIAMINE

Clarence L. Moyle, Clare, Mich., and Clifford L. Meints, Indianola, Iowa, assignors to The Dow Chemical Company, Midland, Mich., a corporation of Delaware No Drawing. Filed Oct. 22, 1959, Ser. No. 847,890
6 Claims. (Cl. 260—404.5)

This invention is concerned with novel carboxamides having the formula

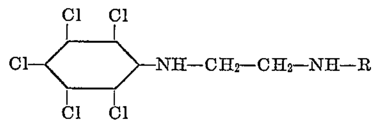

In this and succeeding formulae, R represents an acyl radical derived by the removal of the hydroxyl moiety from the carboxylic radical of a monocarboxylic organic acid. The monocarboxylic organic acids to be employed include formic acid, alkyl monocarboxylic fatty acids, alkenyl monocarboxylic fatty acids containing from 1 to 2 ethylenic unsaturations, alkynyl monocarboxylic fatty acids containing not more than 1 acetylenic unsaturation, benzoic acid, halobenzoic acid, lower alkyl benzoic acid, lower alkoxy benzoic acid, and hydroxy benzoic acid. The expressions lower alkyl and lower alkoxy are used in the present specification and claims to refer to the alkyl and alkoxy radicals containing from 1 to 4, inclusive, carbon atoms. The preferred alkyl monocarboxylic fatty acids, alkenyl monocarboxylic fatty acids, and alkynyl monocarboxylic fatty acids to be employed are those most readily available in commerce and best known in research, namely those containing from 1 to 20, inclusive, carbon atoms.

These new compounds are crystalline solids somewhat soluble in non-polar organic solvents and of low solubility in water. They are useful as parasiticides and are adapted to be employed as active toxic constituents of compositions for the control of many pests such as insects, fungi and bacteria. They have utility also as active components in insect repellent compositions.

The carboxamidesa of this invention may be prepared by causing a reaction between N-pentachlorophenylethylenediamine and a member of the group consisting of a mono-carboxylic acid having the formula R-OH wherein the OH is a part of a carboxyl radical; and the anhydrides, esters and acid chlorides of such mono-carboxylic acids. The reaction between the N-pentachlorophenylethylenediamine and the said mono-carboxylic acid or anhydride is carried out in an inert solvent such as benzene, toluene, dioxane, dimethylformamide or trichlorobenzene.

In carrying out the reaction between the N-pentachlorophenylethylenediamine and mono-carboxylic acid anhydride or mono-carboxylic acid chloride, the reactants are mixed and blended together in the reaction solvent and the resulting mixture maintained for a period of time at a temperature of from 50° to 100° C. The reaction between the diamine and anhydride or acid chloride takes place readily under these conditions with the production of the desired product. Good results are obtained when one molecular proportion of the N-pentachlorophenylethylenediamine is reacted with one half molecular proportion of the anhydride or acid chloride. The by-product of reaction when employing the acid chloride as monocarboxylic acid reactant is the hydrochloride salt of N-pentachlorophenylethylenediamine; the by-product of the reaction, when employing the anhydride as mono-carboxylic acid reactant, is the mono-carboxylic acid salt of N-pentachlorophenylethylenediamine.

In an alternative method, the reaction between the diamine and the acid chloride may be carried out in the presence of a hydrogen chloride acceptor having a basicity greater than that of N-pentachlorophenylethylenediamine such as pyridine or triethylamine. When employing such hydrogen chloride acceptor, good results are obtained when reacting together substantially equimolecular proportions of the diamine, acid chloride and hydrogen chloride acceptor. Upon completion of the reaction, the reaction mixture may be rendered alkaline, as by the addition of an alkali metal hydroxide, filtered and the filtrate washed with water. The washed filtrate may then be fractionally distilled under reduced pressure to separate reaction solvent and obtain the desired product as a crystalline residue. The product may be further purified in conventional fashion such as by rescrystallization or washing.

In carrying out the reaction between the N-pentachlorophenylethylenediamine and mono-carboxylic acid or ester of such mono-carboxylic acid, the reactants are intimately mixed and blended together in the reaction solvent and the resulting mixture maintained with stirring for a period of time at a temperature of from 100° to 200° C. The reaction between the diamine and mono-carboxylic acid or ester of such monocarboxylic acid takes place readily under these conditions with the production of the desired product and water or alcohol, respectively, as byproducts of reaction. Good results are obtained when employing substantially equimolecular proportions of the diamine and mono-carboxylic acid or ester reactant. Upon completion of the reaction, the desired product may be separated and purified as previously described.

The following examples merely illustrate the invention and are not to be construed as limiting.

*Example 1.—N-[2-(pentachloroanilino)ethyl] benzamide*

Benzoyl chloride (14.05 grams; 0.1 mole) was added portionwise with stirring over a period of 10 minutes to 30.85 grams (0.1 mole) of N-pentachlorophenylethylenediamine dissolved in 200 milliliters of dioxane. Stirring was thereafter continued and the reaction mixture was heated at 90° C. for an hour to complete the reaction. The reaction mixture was then made alkaline to the pH of about 10 by the addition of dilute aqueous sodium hydroxide. During the dilution, an N-[2-(pentachloroanilino)ethyl] benzamide product precipitated in the reaction mixture as a crystalline solid, and was separated by filtration. The product was recrystallized from acetone and found to be light tan crystals melting at 151° C. and having a chlorine content of 43 percent and a nitrogen content of 6.75 percent, as compared to theoretical contents of 43 percent and 6.79 percent, respectively.

*Example 2.—N-[2-(pentachloroanilino)ethyl]formamide*

Formic acid (5.5 grams; 0.12 mole) dissolved in 15 grams of pyridine was added as a single portion to 30.85 grams (0.1 mole) of N-pentachlorophenylethylenediamine in solution in 50 grams of warm pyridine. Stirring was thereafter continued and the mixture heated at 80° C. for four hours to complete the reaction. The reaction mixture was then made alkaline by addition of excess dilute aqueous sodium hydroxide. During the dilution the mixture separated into aqueous and non-aqueous layers, and was chilled for four hours with occasional stirring, whereupon an N-[2-(pentachloroanilino)ethyl]-formamide product separated as a solid and was recovered by filtration. The product was recrystallized from acetone and found to be white crystals melting at 105°–106.5° C. The molecular weight of N-[2-(pentachloroanilino)ethyl]formamide is 336.4.

*Example 3.—N-[2-(pentachloroanilino)ethyl]salicylamide*

Phenyl salicylate (42.8 grams; 0.2 mole) was added to 61.7 grams (0.25 mole) of N-pentachlorophenylethylenediamine dissolved in 90 grams of 1,2,4-trichlorobenzene and the resulting mixture was heated with stirring over a period of two hours at gradually increasing temperatures up to the boiling temperature. Stirring was thereafter continued and the reaction mixture maintained at the boiling temperature and under reflux for 2½ hours to complete the reaction. The reaction mixture was then concentrated by distillation at gradually increasing temperatures up to a temperature of 236° C. to remove low-boiling constituents, and the residue thereafter diluted with 50 milliliters of chlorobenzene and cooled. During the cooling an N-[2-(pentachloroanilino)ethyl]salicylamide product precipitated in the mixture as a crystalline solid and was separated by filtration. This product was washed with carbon tetrachloride and the washed product found to melt at 165.5°–166° C. and have a chlorine content of 41.6 percent as compared to a theoretical content of 41.3 percent.

*Example 4.—N-[2-(pentachloroanilino)ethyl] 4-tertiarybutylbenzamide*

4-tert-butylbenzoyl chloride (19.7 grams; 0.1 mole) is added portionwise with stirring during 15 minutes to a mixture of 30.85 grams (0.1 mole) N-pentachlorophenylethylenediamine and 10.1 grams (0.1 mole) triethylamine in 200 milliliters of xylene, and the resulting mixture is heated at 90° C. with stirring for an hour and a half to carry the reaction to completion. The mixture is thereafter cooled and filtered to remove triethylamine hydrochloride byproduct as a residue. The filtrate is diluted with 500 milliliters of cold water to precipitate the desired N-[2-(pentachloroanilino)ethyl]-4-tert-butylbenzamide product having a molecular weight of 468.5.

*Example 5.—N-[2-(pentachloroanilino)ethyl]anisamide*

Methyl anisate (16.5 grams; 0.1 mole) is added to 30.8 grams (0.1 mole) of N-pentachlorophenylethylenediamine dissolved in 150 milliliters of dimethylformamide. The mixture is maintained at a temperature of 140° C. with stirring for 3 hours to complete the reaction. Thereafter the temperature is raised to 160° C. and volatile materials removed by distillation for 20 minutes. The residue is dissolved in 100 milliliters of acetone from which the desired N-[2-(pentachloroanilino)ethyl]anisamide product is precipitated by the addition of water. The molecular weight of N-2-(pentachloroanilino)ethyl anisamide is 442.53.

*Example 6.—N-[2-(pentachloroanilino)ethyl]stearamide*

Stearoyl chloride (23.3 grams; 0.077 mole) was added portionwise to 23 grams (0.075 mole) of N-pentachlorophenylethylenediamine dissolved in a mixture of 60 grams of benzene and 70 grams of pyridine. The addition was carried out over fifteen minutes and at a temperature of 50° C. The reaction mixture was made alkaline to the pH of about 10 by addition of excess dilute aqueous sodium hydroxide, whereupon a precipitate formed. The precipitate was recovered by filtration to obtain an N-[2-(pentachloroanilino)ethyl]stearamide product as a crystalline solid. This product was washed successively with hot water and hot chloroform and found to melt at 98.5° C.

*Example 7.—N-[2-(pentachloroanilino)ethyl]-hexacosanamide*

Hexacosanoic acid (38 grams; 0.1 mole) and 30.85 grams (0.1 mole) of N-pentachlorophenylethylenediamine are mixed and blended together in 250 milliliters of dimethyl formamide, and the mixture heated to a temperature of 150° C. Stirring is thereafter continued and the reaction mixture maintained at 150° C. under reflux for four hours to complete the reaction. To separate the N-[2-(pentachloroanilino)ethyl]hexacosanamide product dilute aqueous sodium hydroxide is added until the entire mixture reaches pH 10. During the addition, the desired product precipitates as a crystalline solid and is recovered by decantation. N-[2-(pentachloroanilino)ethyl]hexacosanamide has a molecular weight of 686.83.

*Example 8.—N-[2-(pentachloroanilino)ethyl]acrylamide*

Acryloyl chloride (9 grams; 0.1 mole) was added dropwise to 31 grams (0.1 mole) of N-pentachlorophenylethylenediamine dissolved in 210 milliliters of dimethylformamide. During the addition, the reaction vessel was continuously cooled to prevent a temperature rise above 75° C. Stirring was thereafter continued for 15 minutes, and the mixture then diluted with aqueous sodium hydroxide, 0.1 mole in 100 milliliters of water. The resulting mixture was thereafter diluted with additional water whereupon an N-[2-(pentachloroanilino)ethyl] acrylamide product precipitated as a crystalline solid and was removed by filtration and washed with chloroform. The washed product melted from 190° to 196° C.

*Example 9.—N-[2-(pentachloroanilino)ethyl]3,4-dichlorobenzamide*

3,4-Dichlorobenzoyl chloride (10 grams; 0.049 mole) was added portionwise over a period of 15 minutes to 14.85 grams (0.048 mole) of N-pentachlorophenylethylenediamine dissolved in dioxane. During the addition, the reaction mixture was maintained at the temperature range of from 92° to 101° C. Stirring was thereafter continued and the mixture heated in the temperature range of 93° to 95° C. for one hour to complete the reaction. The mixture was thereafter cooled. During the cooling period, a precipitate formed in the mixture. The mixture was then filtered to separate an N-[2-(pentachloroanilino)ethyl]3,4-dichlorobenzamide product as a crystalline solid. The product was recrystallized from acetone, and found to have a melting point of 156.7°–157.2° C.

*Example 10.—N-[2-(pentachloroanilino)ethyl] acetamide*

Acetic anhydride (10.2 grams; 0.1 mole) was added with stirring as a single portion to 30.85 grams (0.1 mole) of N-pentachlorophenylethylenediamine dissolved in 125 grams of dioxane at a temperature of 40° C. Stirring was thereafter continued and the mixture maintained at a temperature of 75° for 30 minutes, to carry the reaction to completion. To separate the N-[2-(pentachloroanilino)ethyl] acetamide product, 4.4 grams (0.11 mole) of sodium hydroxide dissolved in 35 milliliters of water was added to the reaction mixture with stirring. The alkaline mixture was then diluted with water to double its entire volume and chilled for 30 minutes. During the chilling, the acetamide product precipitated as a crystalline solid, and was removed by filtration and recrystallized from acetone. This product melted at 109.5° C. and has a chlorine content of 50.6 percent and a nitrogen content of 7.80 percent as compared to theoretical contents of 50.6 percent and 7.99 percent, respectively.

*Example 11.—N-[2-(pentachloroanilino)ethyl] propionamide*

Propionic anhydride (13 grams; 0.1 mole) was added to 30.85 grams of N-pentachlorophenylethylenediamine (0.1 mole) dissolved in 100 grams of pyridine. The mixture was heated to a temperature of 75° C. and agitated for 15 minutes to complete the reaction. The reaction mixture was thereafter diluted with aqueous sodium hydroxide. During the dilution an N-[2-(pentachloroanilino)ethyl] propionamide product precipitated in the mixture and was separated by filtration. This product was successively recrystallized from benzene and acetone, and found to melt at 129° C., and have a chlorine content of 48.7 percent as compared to a theoretical content of 48.6 percent.

In a similar manner, other compounds of the present invention may be prepared as follows:

N-[2-(pentachloroanilino)ethyl]oleoylamide by reacting together N-pentachlorophenylethylenediamine and oleoyl chloride:

N-[2-(pentachloroanilino)ethyl] crotonamide by reacting together N-pentachlorophenylethylenediamine and ethyl crotonate:

N-[2-(pentachloroanilino)ethyl] 4 - bromobenzamide by reacting together N-pentachlorophenylethylenediamine and 4-bromobenzoyl chloride:

N-[2 - (pentachloroanilino)ethyl] 2,4 - dimethylbenzamide by reacting together N-pentachlorophenylethylenediamine and 2,4-dimethylbenzoic acid:

N-[2-(pentachloroanilino)ethyl] 2-hydroxy-3-methoxy-5-methylbenzamide by reacting together N-pentachlorophenylethylenediamine and 3-methoxy-2,5-cresotic acid:

N-[2-(pentachloroanilino)ethyl] 3-methoxy-4-hydroxybenzamide by reacting together N-pentachlorophenylethylenediamine and vanilloyl chloride:

N-[2-(pentachloroanilino)ethyl] 3-chloro - 4 - hydroxybenzamide by reacting together N-pentachlorophenylethylenediamine and methyl 3-chloro-4-hydroxybenzoate:

N-[2-(pentachloroanilino)ethyl]3 - methyl - 4 - ethoxybenzamide by reacting together N-pentachlorophenylethylenediamine and 3-methyl-4-ethoxybenzoic acid:

N-[2-(pentachloroanilino)ethyl]4 - methyl - 5 - bromobenzamide by reacting together N-pentachlorophenylethylenediamine and 4-methyl-5-bromobenzoyl chloride:

N-[2-(pentachloroanilino)ethyl]linoleoylamide by reacting together N-pentachlorophenylethylenediamine and linoleic acid.

N-[2-(pentachloroanilino)ethyl]propiolamide, by reacting together N-pentachlorophenylethylenediamine and propiolic acid.

N-[2-(pentachloroanilino)ethyl]arachidamide, by reacting together N-pentachlorophenylethylenediamine and arachidic acid.

N-[2-(pentachloroanilino)ethyl]3-chloro - 4 - methoxybenzamide by reacting together N-pentachlorophenylethylenediamine and 3-chloro-4-methoxybenzoyl chloride.

N-[2 - (pentachloroanilino)ethyl]4 - ethoxybenzamide by reacting together N-pentachlorophenylethylenediamine and 4-ethoxybenzoic acid.

The new substituted carboxamides of this invention are adapted to be employed for the control of agricultural and household pests. For such use, these compounds may be dispersed on an inert finely divided solid and employed as a dust. Also, such preparations may be dispersed in water with or without the aid of a wetting agent and the resulting aqueous suspension employed as a spray or wash. In other procedures, the products may be employed in oils, or as constituents in oil-in-water emulsions or aqueous dispersions. In representative operations the application to the foliage of tomato plants of aqueous spray compositions comprising one half pound of N-[2-(pentachloroanilino)ethyl] acrylamide per 100 gallons of spray mixture gave substantially complete control of *Alternaria solani* (tomato early blight).

N-pentachlorophenylethylenediamine employed as a starting material as herein described may be prepared by causing equimolecular proportions of hexachlorobenzene and ethylene diamine to react by mixing the said reactants together and heating the mixture at the boiling temperature of ethylene diamine, 117° C. Upon completion of the reaction the mixture is cooled to room temperature and diluted with water. During the dilution, the N-pentachlorophenylethylenediamine precipitates as a white crystalline solid and is separated by filtration or decantation. N-pentachlorophenylethylenediamine melts at 91°–93° C.

This is a continuation in part of Serial Number 688,114, filed October 4, 1957, now abandoned.

We claim:

1. A compound corresponding to the formula

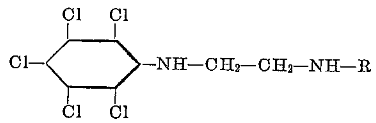

wherein R represents an acyl radical derived by the removal of the hydroxyl moiety from the carboxylic radical of a monocarboxylic organic acid selected from the group consisting of formic acid, alkyl-, monoalkenyl-, dialkenyl-, and monoalkynylmonocarboxylic fatty acids, benzoic acid, halobenzoic acid, lower alkylbenzoic acid, lower alkoxybenzoic acid, and hydroxybenzoic acid, wherein the terms lower alkyl and lower alkoxy refer to alkyl and alkoxy radicals containing from 1 to 4, inclusive, carbon atoms, and the terms alkyl, alkenyl and alkynyl are used to refer to alkyl, alkenyl, and alkynyl groups containing from 1 to 20, inclusive, carbon atoms.

2. N-[2-(pentachloroanilino)ethyl]formamide.

3. N-[2-(pentachloroanilino)ethyl]acrylamide.

4. N-[2-(pentachloroanilino)ethyl]stearamide.

5. N-[2 - (pentachloroanilino)ethyl]3,4 - dichlorobenzamide.

6. N-[2-(pentachloroanilino)ethyl]salicylamide.

References Cited in the file of this patent

UNITED STATES PATENTS 1,926,014 Rosenmund ------------ Sept. 5, 1933

OTHER REFERENCES

Degering: "An Outline of Organic Nitrogen Compounds," University Lithoprinters (Ypsilanti, Mich.), pp. 397–399 (1950).

Sidgwick: "Organic Chemistry of Nitrogen," Clarendon Press (Oxford), pp. 136–139 (1937).